Patented Jan. 20, 1942

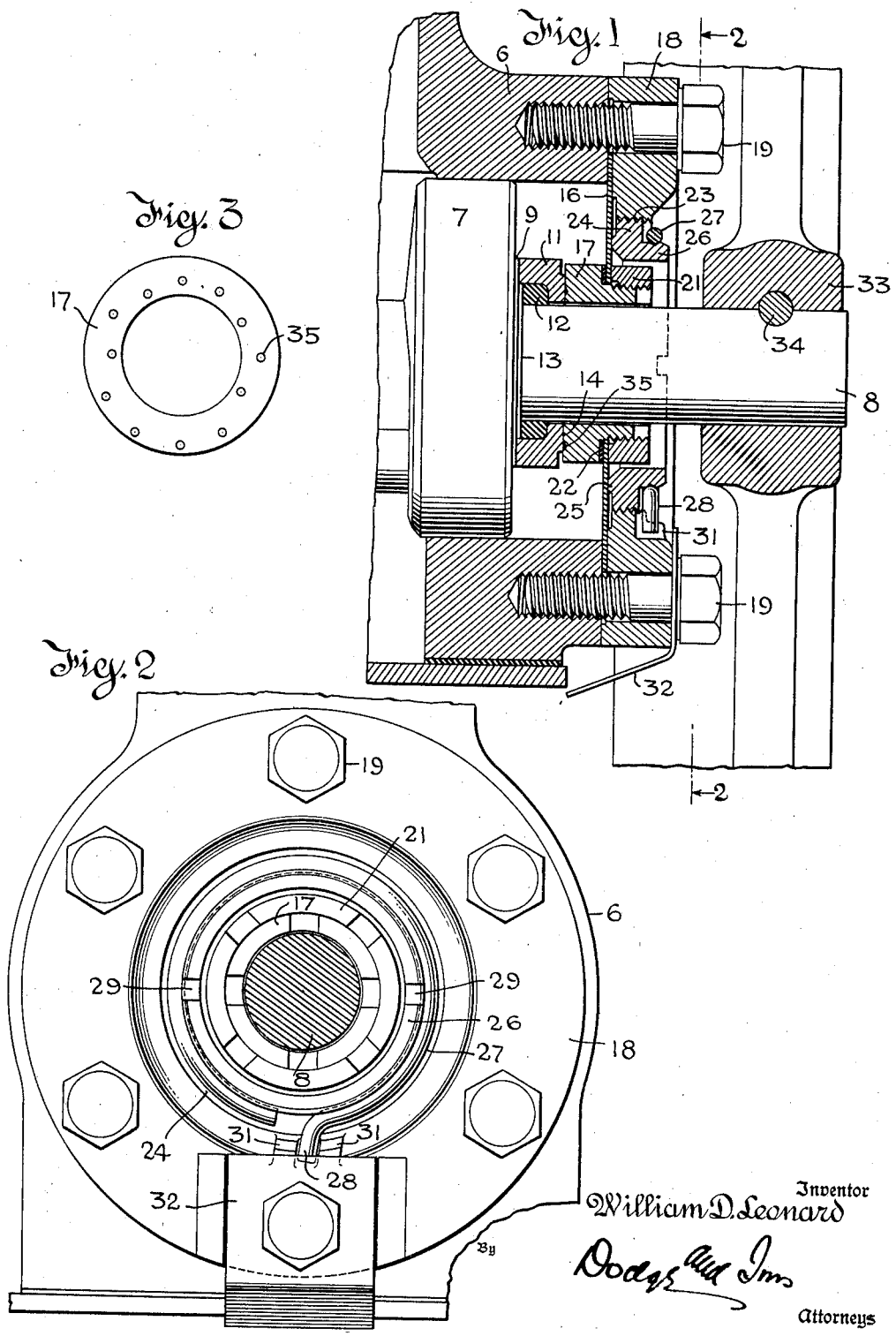

2,270,811

UNITED STATES PATENT OFFICE 2,270,811

ADJUSTABLE BALANCE SEAL

William D. Leonard, York, Pa., assignor to York Ice Machinery Corporation, York, Pa., a corporation of Delaware Application October 24, 1940, Serial No. 362,692

2 Claims. (Cl. 286—11)

This invention relates to shaft seals intended chiefly for use with refrigerative compressors and is an improvement on the seal described and claimed in the patent to Dennison and Leonard No. 2,008,580, issued July 16, 1935.

Where small reciprocating compressors are used in a refrigerating system, the crank case is commonly at, or substantially at, the suction pressure in the system and with certain refrigerants this suction pressure may vary above and below atmospheric pressure so that the crank shaft seal must resist leakage in both directions, that is out-leakage of refrigerant and in-leakage of air.

An important novel feature of the Dennison and Leonard patented seal is that it makes use of two sealing rings whose contacting faces are lapped surfaces, one of said sealing rings being mounted on the shaft and the other of said sealing rings being carried by the flexible diaphragm which is supported on the crank case and encircles the shaft and the ring which it carries. An annular fulcrum subdivides the effective area of the diaphragm into two portions which are so related that when atmospheric pressure predominates, the entire area of the diaphragm is effective to maintain sealing engagement between the two rings, whereas when crank case pressure predominates, the annular area of the diaphragm outside the annular fulcrum so exceeds the annular area within the annular fulcrum that the sealing pressure is maintained. When the two pressures are equal, flexure of the diaphragm occasioned by slight stress exerted through the fulcrum is relied upon to maintain the desired seal.

In the Dennison and Leonard device the ring which rotated with the shaft made a lapped fit with the shaft and reliance was placed on the lapped fit to secure the desired tight joint. This is an expensive construction and one feature of the present invention is a new and less expensive mount for the ring which turns with the shaft.

In the prior Dennison and Leonard arrangement the seat for the periphery of the diaphragm in the clamping ring was so located as to have a definite relation to the annular fulcrum carried by the clamping ring. Shims were used between the diaphragm and the crank case to permit attainment of the desired adjustment of pressure between the fixed and the rotating sealing ring. This arrangement is successful but entails expensive operations during assembly. It has also been found that if the seal is dismounted after a compressor has been in service for a considerable period, it is difficult to reassemble it and secure a satisfactory seal. It can be done but cannot be done with the ease and absolute certainty desirable in commercial operations.

An important feature of the present invention is the provision of means for adjusting the fulcrum relatively to the diaphragm clamping ring. Experience with this scheme has demonstrated that it has a number of important advantages. It permits reassembly of a worn compressor without particular precautions and with the certainty that the seal will function properly. It eliminates the use of troublesome and expensive gauges heretofore considered necessary to assure proper assembly. It eliminates the necessity of educating service men in the correct use of such gauges. It permits adjustment by feel which not only gives a more precise and sensitive adjustment but will give it in the hands of comparatively inexperienced operators. Basically, however, the seal functions in the same manner as the seal disclosed in the Dennison and Leonard patent.

An important feature of the invention is that the adjustable fulcrum is threaded into an opening in the diaphragm clamping ring and the threads are slack or rather loosely fitted. This has two purposes. It permits slight self-alignment of the fulcrum so that the plane of the annular fulcrum will automatically become parallel with the contacting faces of the two lapped sealing rings. The free fit permits ready adjustment by touch or feel, eliminating errors such as those which are inherent in the possible misuse of a gauge.

Another important feature of the invention is that the threaded fulcrum is retained in adjusted position by a frictional retainer which can be set in any desired position and which is so contrived that it does not prevent or event resist the self-aligning tendency of the adjustable fulcrum.

Another feature of the invention is the use of a double series of lubricant pockets in the sealing rings, the effect being to render the seal indifferent to the direction of rotation of the compressor.

In the drawing, which illustrates a commercial embodiment of the present invention:

Fig. 1 is an axial section through the improved seal.

Fig. 2 is a section on the line 2—2 of Fig. 1.

Fig. 3 is a face view of the sealing surface of the non-rotating ring.

Referring first to Figs. 1 and 2, a portion of the crank case of the compressor is indicated at 6, and 7 represents one of the enlarged journals in the crank shaft 8 which turns in a plain bearing in the crank case 6. The shaft has a shoulder 9 against which is mounted the rotating sealing ring 11. This sealing ring is counterbored on its left-hand or inner face to receive a gasket 12 composed of neoprene, which is a trade name for a synthetic resilient plastic resembling rubber but having longer life and having the desirable characteristic of resisting chemical reaction with commercial refrigerants of the type with which these compressors are used. Ring 11 is centered by a boss 13 which is formed on the outer face of journal 7 and enters the counterbore in which gasket 12 is mounted. In this way a tight seal is produced and the ring is accurately aligned and centered without requring the expensive lapping operations heretofore used.

The outer plane face of the ring 11, indicated by the numeral 14, is finished by lapping. The diaphragm 16 which carries the fixed or non-rotating ring 17 is clamped at its outer periphery between a seat machined on the crank case 6 and a cover plate 18 which is held in place by a circular series of machine screws 19. No shims are used. The diaphragm 16 is annular, as shown in the drawing, and is concentric with shaft 8 which it encircles. Ring 17, whose inner or sealing face is finished by lapping, has an extension on its outer end which enters the central aperture in the diaphragm 16, to which it is clamped by a threaded nut 21. A neoprene gasket 22 affords a perfect seal between the diaphragm and the ring 17.

The clamping ring 18 is threaded at its interior, as indicated at 23. Loosely fitted into these threads 23 is the fulcrum carrying annulus 24. The fulcrum proper is indicated at 25, and engages the outer face of the diaphragm 16 in a complete circle whose diameter is appropriate to the attainment of the results characteristic of the Dennison and Leonard patented seal. Since the ring 11 bears against a true face 9 and is centered by the boss 13, its lapped face 14 must run true. Consequently the ring 17 must also assume a true position.

The fulcrum ring 24 is turned by hand until a proper sealing pressure is developed between the rings 17 and 11. Since the parts are freely fitted, the member 24 can be precisely adjusted by feel. The generally conical form of the flanks of the threads 23 permits, in a loosely fitted thread, sufficient self-aligning action to compensate for slight inaccuracies in manufacture. Consequently the fulcrum 25 is caused to engage the diaphragm 16 with uniform pressure continuously around the entire circumference of the fulcrum.

The threaded ring 24 has a projecting sleeve 26 which is peripherally grooved to retain a snap ring 27 formed of wire and having a projecting end or lug 28. To afford ready means for turning the ring 24 the flange 26 is notched, as indicated at 29 on Fig. 2. Thus a spanner may readily be applied for the purpose of turning the ring, but ordinarily the ring is turned with the fingers.

The rotation of the crank shaft 8 imposes no rotary tendency on the diaphragm or on the ring 24. Consequently the snap ring 27 need not engage the flange 26 very tightly and in practise the frictional engagement is moderate and such as to permit ring 27 to be slid around the flange 26 without the exertion of much force. The lug 28 is confined between two lugs 31 formed on a portion of the clamping ring 18, as best shown in Fig. 2.

The sheet metal clip 32 has no relation to the seal. Its purpose is to divert any oil which might escape through the seal and prevent it from dripping upon the fly-wheel 33. Such oil will follow the clip 32 by capillary action and drip from its end. The fly-wheel is retained by a tangent key 34. It is removed during the operation of adjusting the seal. The parts are assembled with the ring 24 backed out at least part way and the snap ring 27 not applied. After the parts are completely assembled the ring 24 is screwed in until the diaphragm 16 is properly stressed. This can readily be determined by touch. When this adjustment has been made the ring 27 is snapped into place with the lug 28 between the lugs 31.

In Fig. 3 the face of the non-rotating ring 17 is illustrated. Instead of having one series of spirally arranged recesses, as proposed in the Dennison and Leonard patent, there are two reversely arranged spiral series, the purpose of which is to render the compressor indifferent to the direction of rotation. It is to be recalled that the function of these recesses is to pick up oil which enters the outermost recess, the oil being passed from recess to recess since their respective orbits overlap. The importance of maintaining an oil film between the two sealing components will be readily appreciated by those skilled in the art.

While one embodiment has been described in great detail, this is intended to be illustrative and not limiting, the scope of the invention being defined in the claims. For example, the mounting of ring 11 with a gasket is preferred, but so far as the threaded adjustment of fulcrum 25 is concerned the part 11 can make a lapped fit with the shaft, as proposed in the Dennison and Leonard patent, or might even be integral with the shaft, as also suggested in said patent.

I claim:

1. In a sealed joint, the combination of a flexible diaphragm subject to a reversible fluid pressure differential; a joint seal comprising means affording two relatively rotatable sealing surfaces in sealing engagement with each other, one of said surfaces being axially movable and supported by said diaphragm; an annular fulcrum engaging said diaphragm and reacting thereupon in a direction to produce engagement of the diaphragm carried surface with the other surface; supporting means for said fulcrum, comprising means permitting sufficient universal tilting of said fulcrum to render it self-aligning and adjustable sustaining means to resist thrust exerted upon the fulcrum by the diaphragm; and means for maintaining the adjustment of said sustaining means.

2. In a sealed joint, the combination of a flexible diaphragm subject to a reversible fluid pressure differential; joint sealing means comprising two relatively rotatable annular sealing components in sealing engagement with each other, one of said components being a ring which is axially movable and supported by said diaphragm; a fixed support concentric with said diaphragm; an adjustable member loosely threaded to said support and having a bead engaging said diaphragm adjacent said ring and serving as an annular fulcrum, said fulcrum reacting upon the diaphragm in a direction to produce engagement of the diaphragm carried ring with the other sealing component; and a retainer engaging said adjustable member and serving to retain the same against rotation while leaving it otherwise free to align itself.

WILLIAM D. LEONARD.